United States Patent
Sharon et al.

(10) Patent No.: US 12,422,857 B2
(45) Date of Patent: Sep. 23, 2025

(54) SMART DRONE RESCUE AND MISSION RESCHEDULING ON A SWARM OF DRONES

(71) Applicant: INTERNATIONAL BUSINESS MACHINES CORPORATION, Armonk, NY (US)

(72) Inventors: Gil Sharon, Haifa (IL); Nir Rozenbaum, Yoqneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 18/337,121

(22) Filed: Jun. 19, 2023

(65) Prior Publication Data

US 2024/0419177 A1 Dec. 19, 2024

(51) Int. Cl.
| | |
|---|---|
| G05D 1/85 | (2024.01) |
| B64U 80/00 | (2023.01) |
| G05D 1/00 | (2006.01) |
| B64U 101/55 | (2023.01) |

(52) U.S. Cl.
CPC ............. G05D 1/104 (2013.01); B64U 80/00 (2023.01); G05D 1/85 (2024.01); *B64U 2101/55* (2023.01)

(58) Field of Classification Search
CPC .... G05D 1/0027; G05D 1/6546; G05D 1/686; G05D 1/689; G05D 1/85; G05D 2105/55; G05D 2109/20
See application file for complete search history.

(56) References Cited

U.S. PATENT DOCUMENTS

| | | | |
|---|---|---|---|
| 8,983,682 B1 * | 3/2015 | Peeters | G05D 1/0011 |
| | | | 701/2 |
| 10,909,859 B1 | 2/2021 | Dodd | |
| 11,036,240 B1 | 6/2021 | Irschara | |
| 2017/0092109 A1 * | 3/2017 | Trundle | G05D 1/104 |
| 2018/0188724 A1 * | 7/2018 | Jassowski | G05D 1/104 |
| 2019/0047698 A1 | 2/2019 | Jassowski | |
| 2021/0157012 A1 * | 5/2021 | Wajnberg | G01S 19/15 |

FOREIGN PATENT DOCUMENTS

| | | | |
|---|---|---|---|
| CN | 112711268 A | | 4/2021 |
| JP | 2022083949 A | * | 6/2022 |

OTHER PUBLICATIONS

Cambridge Dictionary—definition of word "comprise" (https://dictionary.cambridge.org/dictionary/english/comprise), retrieved on Jul. 11, 2025. (Year: 2025).*

(Continued)

*Primary Examiner* — Dino Kujundzic
(74) *Attorney, Agent, or Firm* — Robert D. Bean (57) ABSTRACT

According to one embodiment, a method, computer system, and computer program product for rescuing a malfunctioning drone is provided. The present invention may include responsive to detecting a total failure in a malfunctioning drone comprising a drone fleet, operating one or more rescue drones to physically or virtually attach to the malfunctioning drone; reconfiguring sub-missions comprising a mission assigned to the drone fleet based on an absence of the malfunctioning drone and the one or more rescue drones; and transporting, by the one or more rescue drones, the malfunctioning drone to a safe landing location.

20 Claims, 4 Drawing Sheets

(56) References Cited

OTHER PUBLICATIONS

The Britannica Dictionary—definition of word "comprise" (https://www.britannica.com/dictionary/comprise), retrieved on Jul. 11, 2025. (Year: 2025).*

Machine translation of JP 2022083949 A (Year: 2022).*

Binotto, et al., "Real-time task reconfiguration support applied to an UAV-based surveillance system," 2008 International Multiconference on Computer Science and Information Technology, 2008 [accessed on Apr. 18, 2023], pp. 581-588, IEEE, Wisla, PL, ISBN: 978-83-60810-14-9, DOI: 10.1109/IMCSIT.2008.4747302, Retrieved from the Internet: <URL: https://ieeexplore.ieee.org/document/4747302>.

Disclosed Anonymously, "System to Detect a Safe Landing Zone for a Drone that has Lost the Signal with the Controller," IP.com, Feb. 16, 2022, 3 pages, IP.com No. IPCOM000268690D, Retrieved from the Internet: <URL: https://priorart.ip.com/IPCOM/000268690.

* cited by examiner

SMART DRONE RESCUE AND MISSION RESCHEDULING ON A SWARM OF DRONES

BACKGROUND

The present invention relates, generally, to the field of computing, and more particularly to unmanned aircraft systems.

The field of unmanned aircraft systems may be the field concerned with the development and operation of unmanned aircraft, commonly referred to as drones. An Unmanned Aircraft System (UAS) is a system comprised of several components that work together to enable the operation of an aircraft without an onboard human pilot. The most important component of the UAS is the unmanned aircraft itself, often known as a drone, which operates without a human pilot onboard. The drone can range in size from small handheld devices to large, fixed-wing aircraft. Where the drone is remotely piloted, the UAS may further include ground-based hardware and software components that allow an operator to communicate with and control the unmanned aircraft, which may include a remote controller, a video display or monitor, and various control interfaces. In some cases, the airframe of the drone may alternatively or additionally possess its own integrated processing hardware to allow some measure of independent flight and operation. UASs have gained significant popularity and are used in various industries and applications, including aerial photography and videography, surveying and mapping, agriculture, infrastructure inspection, search and rescue operations, environmental monitoring, and even package delivery. They offer advantages such as cost-effectiveness, accessibility, and the ability to operate in challenging or dangerous environments without risking human lives.

SUMMARY

According to one embodiment, a method, computer system, and computer program product for rescuing a malfunctioning drone is provided. The present invention may include responsive to detecting a total failure in a malfunctioning drone comprising a drone fleet, operating one or more rescue drones to physically or virtually attach to the malfunctioning drone; reconfiguring sub-missions comprising a mission assigned to the drone fleet based on an absence of the malfunctioning drone and the one or more rescue drones; and transporting, by the one or more rescue drones, the malfunctioning drone to a safe landing location.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to unmanned aircraft systems. The following described exemplary embodiments provide a system, method, and program product to, among other things, identify a malfunction in a drone operating as part of a drone fleet, tow the malfunctioning drone to a safe landing location using a rescue drone, and reconfigure drone fleet mission instructions to exclude the rescue drone and the malfunctioning drone.

As previously described, UASs have gained significant popularity and have been adopted in various industries and applications for their cost-effectiveness, accessibility, and ability to operate in challenging or dangerous environments without risking human lives. One application for which UASs have been widely applied is that of drone inspections; drones are used daily in a multitude of industries and fields for conducting visual inspections of assets, hardware, civil and private infrastructure, terrain, et cetera.

The two biggest and most common challenges in the drone inspections industry are the challenges in scanning large areas in relatively short amount of time, and the challenges in performing tasks that require multiple functionalities and/or payloads (e.g., infra-red camera, Lidar, lifting capacity, et cetera) to execute. A single drone has limited payload capabilities and battery life; as such, a single drone may be limited to relatively short periods of operation between charging periods, and may not be able to support all of the functionalities and/or payloads required for the mission, resulting in very long mission completion times as the drone frequently returns to a base station to recharge and/or swap capabilities. Fleets of drones are already well known as the best solution for these common challenges, for two main reasons: one, drone fleets are scalable in size, and may be adjusted to incorporate whatever number of drones may be required for a mission. This may, for example, enable a drone fleet to scan a vast area using dozens of drones operating in parallel, where each drone of the fleet is responsible for scanning a different sub-area of the mission region. Second, drone fleets allow a collaboration between completely different drone models, allowing drones with specialized functionalities, payload carrying capabilities, technical specs, et cetera to be mixed into the drone fleet as necessary to perform a given mission. This may, for example, enable a drone fleet to incorporate a drone with an infrared camera to scan a water pipe network for leaks; once the infrared camera drone has identified a leak, a different drone of the drone fleet equipped with a narrow-angle long-range zoom camera may be deployed to the site of the leak to take a photograph or video of the leakage area in high-resolution imagery. Drone fleets are becoming more and more useful and ubiquitous with time, and there is no doubt that the need to use drone fleets for daily drone tasks, as well as for collaborative drone inspections, will significantly rise in the next decade.

However, as the number of drone fleet tasks increase over time and as the technology matures, so too does the complexity of such tasks. For example, drone fleets may often include dozens, and sometimes even hundreds, of relatively small and simple drones, and may require perfect or nearly perfect coordination between them, which may place significant stress on the drones. Accordingly, as the complexity of tasks and the size of drone fleets increase, increasing stresses are placed on the individual drones of the fleet. As a result, mechanical, electrical, and software failures are becoming more widespread in members of drone fleets. Due to the close geographic proximity of fleet drones in many situations, such failures may cascade as a malfunctioning drone has a high chance of colliding with other drones in its formation, causing additional failures. In addition to posing a danger to other drones of the fleet, malfunctioning drones present a danger to whatever is beneath them, whether it be infrastructure, cars, or human beings. As such, responding to drone failures and mitigating the effects of crashes is of great importance in preventing damage to property and preventing human injury.

As such, it may be advantageous to, among other things, implement a system that proactively and immediately responds to any indication of malfunction in a drone that is part of a drone fleet, intercepting the drone with a specialized rescue drone and transporting the malfunctioning drone to a safe landing zone, while preventing the drone from crashing, and reconfiguring the mission instructions for the rest of the drones in the drone fleet such that the mission objectives may be completed without the malfunctioning drone. Therefore, the present embodiment has the capacity to improve the technical field of unmanned aircraft systems by preventing malfunctioning drones from crashing in real time as critical malfunctions are detected, thereby preventing collateral damage to nearby drones, impact damage to the malfunctioning drone, damage to people or property below the drone, and enabling safe recovery of the malfunctioning drone. The present embodiment may additionally have the capacity to improve the technical field of unmanned aircraft systems by reconfiguring the mission instructions in real time to adapt to the loss of a drone and enable the remaining drones to complete the mission without compromising the mission objectives.

According to at least one embodiment, the invention is a system comprising a drone fleet of two or more drones remotely controlled by a fleet controller, wherein the drone fleet comprises at least one mission drone and at least one rescue drone, and wherein the rescue drone is equipped to connect to the at least one mission drone during flight and carry the mission drone to a safe landing location.

According to at least one embodiment, the invention is a method for detecting a malfunctioning drone comprising a multi-drone drone fleet suffering a total failure, operating a rescue drone to connect to the malfunctioning mission drone, and towing, by the rescue drone, the malfunctioning mission drone to a safe landing location. This enables a drone fleet to catch and rescue individual drones that malfunction and lose altitude before they hit the ground, thereby preventing harm to humans and property below and preventing further damage to the malfunctioning drone itself or any nearby drones that the malfunctioning drone may be in danger of colliding with.

In embodiments, the rescue drone may be selected from among multiple rescue drones based on a distance between the rescue drone and the malfunctioning drone, the distance between the rescue drone and the safe landing location, the speed of the drone, the payload capacity of the drone, an attachment mechanism equipped by the rescue drone and whether that attachment mechanism is compatible with the malfunctioning drone, and/or the remaining power reserves of the rescue drone. Selecting the rescue drone from such factors improves the chances that the rescue drone will be capable of arriving fast enough and with the correct attachment mechanism to successfully catch the malfunctioning drone before it falls, will have the lifting capacity to lift the malfunctioning drone, and will have sufficient fuel reserves to make the trip to the safe landing location with the malfunctioning drone in tow.

In some embodiments, for example where the malfunctioning drone is experiencing a failure in one or more of its sensors which does not impair the drone's ability to fly but does impair navigation, such as a malfunction to the drone's camera and/or GPS sensor that makes geographical positioning impossible or unreliable, the system may assign a drone of the drone fleet to rescue the malfunctioning drone by performing a virtual attachment. "Attach" or "attachment," as used herein, may refer to both virtual and physical attachment unless otherwise specified. A virtual attachment may be performed by navigating a rescue drone to close physical proximity of the malfunctioning drone, such that the sensor data gathered by the rescue drone, such as camera, sonar, and/or GPS location data, may be used to navigate the malfunctioning drone; once in close physical proximity to the malfunctioning drone, the system may issue navigation commands to the malfunctioning drone using sensor data from the rescue drone, allowing the system to navigate the malfunctioning drone to a safe landing location. The system may maintain the virtual attachment, maintaining the proximity of the rescue drone to the malfunctioning drone, until the malfunctioning drone has landed at the safe landing location. In embodiments, the rescue drone may be any drone equipped to fly and navigate, as a virtual attachment requires no specialized equipment. In embodiments, the virtual attachment may comprise keeping the malfunctioning drone within continuous sensor coverage of the rescue drone and/or one or more other drones, such that the system receives sufficient sensor data from sources external to the malfunctioning drone to navigate the malfunctioning drone to a safe landing location; in such embodiments, physical proximity of a rescue drone or other drone may not be required. Virtual attachment allows a malfunctioning drone incapable of navigating to be safely recovered using sensor data from other drones.

In embodiments, the method may further include reconfiguring sub-missions comprising a mission assigned to the drone fleet, to compensate for the absence of the malfunctioning drone and the rescue drone or drones. Reconfiguring sub-missions to compensate for the absence of the malfunctioning drone enables a drone fleet to dynamically adapt to losses and rebalance the work among the remaining drones, minimizing the effect of drone losses on the performance of the mission.

In embodiments, the method may further include canceling a sub-mission assigned to the malfunctioning drone, responsive to detecting the total failure in the malfunctioning drone. Canceling the sub-mission prevents the malfunctioning drone from moving or attempting to perform any function besides remaining stationary at a fixed height, allowing the rescue drone to more easily reach and attach to the malfunctioning drone.

In embodiments, the method may include assigning a sub-mission to the rescue drones responsive to delivering the malfunctioning drone to the safe landing location. Assigning a sub-mission to the rescue drones delivering the malfunctioning drone to the safe landing location enables the rescue drones to return to the drone fleet once their rescue mission has been performed, and participate in achieving the mission, thereby maximizing availability of the drones of the drone fleet and improving the efficiency with which the drone fleet carries out the mission.

In embodiments, transporting the malfunctioning drone to the safe landing location may include transmitting the same instructions to both the rescue drones and the malfunctioning drone, based on sensor data from the one or more rescue drones. The server will consolidate all instructions being sent to the drones altogether, meaning that every instruction between attachment and reaching the safe landing location will be sent from the server to both the tow-drone and the malfunctioned drone, while all sensor data required in order to navigate the drones to that point will be received from the rescue drone only; using only the rescue drone's sensors prevents accidents, since the sensors of the malfunctioning drone can no longer be trusted and may cause errors in navigation. Consolidating instructions allows the malfunctioning drone to assist the rescue drone in transporting the malfunctioning drone, to the extent that the malfunctioning drone is capable, and reduces the chances of the malfunctioning drone executing conflicting movement orders relative to the rescue drone that might pull the rescue drone off course, add strain and energy consumption, and risk damage to both drones from collision or separation due to a breakage of the attachment mechanism.

In embodiments, the detecting may be based on identifying anomalous behavior of the malfunctioning drone within sensor data from a number of sensors of one or more of the drones that comprise the drone fleet. Identifying anomalous behavior and malfunction through sensor data gathered from sources external to a given drone is advantageous in that it enables the system to identify and react to a malfunction even where a malfunctioning drone has lost the ability to transmit, receive, or process instructions, and therefore cannot transmit self-diagnostic reports that might provide explicit evidence of a malfunction.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to identify a malfunction in a drone operating as part of a drone fleet, tow the malfunctioning drone to a safe landing location using a rescue drone, and reconfigure drone fleet mission instructions to exclude the rescue drone and the malfunctioning drone.

Figure 1:
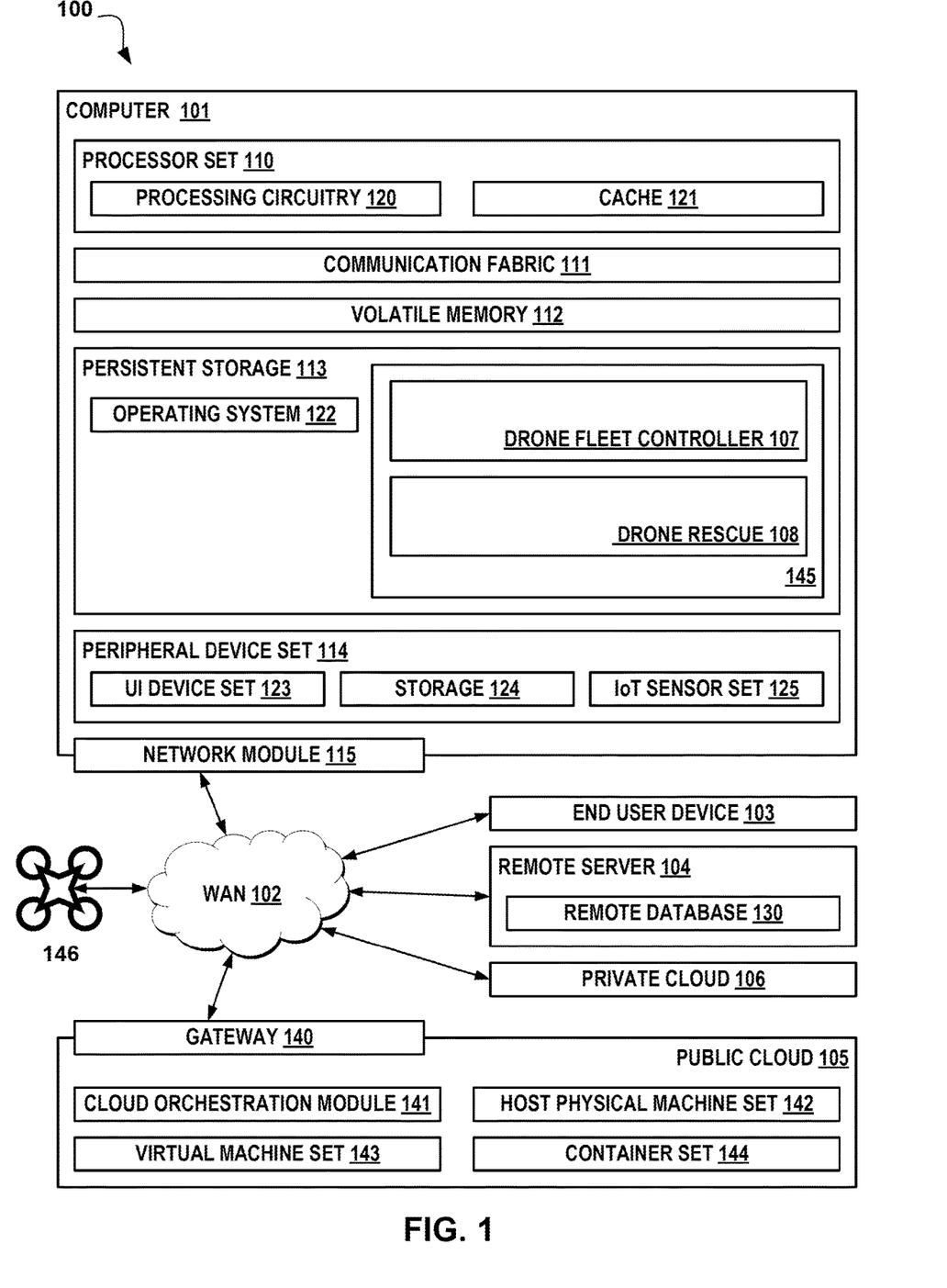
FIG. 1 illustrates an exemplary networked computer environment according to at least one embodiment.

Referring now to FIG. 1, computing environment 100 contains an example of an environment for the execution of at least some of the computer code involved in performing the inventive methods, such as code block 145, which may comprise drone fleet controller program 107 and drone rescue program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, container set 144, and drone fleet 146.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated. In embodiments, computer-implemented methods may be implemented on one or more airborne computing devices, such as those comprising the drones of drone fleet 146, and/or on one or more ground-based computing devices, such as those of computer 101.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future, including, for example, radio waves, satellite communication, and cellular networks. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers. The WAN 102 may be capable of linking the drone fleet controller 107 and/or the drone rescue program 108 with the drone fleet 146, to enable real-time or near-real-time transmission of commands, telemetry data, video feed, et cetera between one, several, or all drones comprising the drone fleet 146 and the drone fleet controller 107 and/or drone rescue program 108. The WAN 102 may be capable of linking the drones comprising the drone fleet 146 such that they may communicate with each other, for example in embodiments where the WAN 102 is supplemented with one or more LANs.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the drone fleet 146 may comprise two or more unmanned aircraft, or drones, where at least one of the drones comprises a rescue drone. The drone fleet 146 may be assigned a mission, where the mission comprises one or more mission objectives and mission instructions, and which may comprise a number of sub-missions assigned to each drone of the drone fleet 146. The mission may be a task that the drone fleet 146 is collectively assigned to complete, such as scanning water pipes in a region for leaks, providing visual data of a crop field, searching for structural flaws in a building, et cetera; the mission may be considered to be completed once one or more mission objectives have been met, where mission objectives may include providing visual data on 100% of a geographic region, visually inspecting four assets for defects, meeting another mission objective within a certain amount of time, et cetera. The mission may be broken down into sub-missions, where each sub-mission corresponds to a sub-task to be performed by a single drone; once all sub-missions have been completed, so too will the larger mission be completed, and the mission objectives met. For example, where the mission is providing visual data on a large geographical region, the drone controller 107 may divide the large geographical region into a number of sub-regions equivalent to the number of drones in the swarm equipped to provide visual data, and may task each drone with the sub-mission of inspecting a different sub-region, such that once all the sub-missions are completed, so too will the mission be completed. In embodiments, the number of sub-missions may equal the number of drones or non-rescue drones comprising the drone fleet 146 or may exceed the number of drones or non-rescue drones, such that at least one drone must complete multiple sub-missions in executing the mission. The mission may comprise mission instructions, which may comprise sets of instructions for operating individual drones and/or multiple drones in concert to complete the mission objectives. The mission instructions may be pre-provided, dynamically created and/or modified in real time responsive to changing conditions, and/or some combination of the two, and may be provided to the drone fleet 146 collectively and/or drones of the drone fleet 146 on an individual basis by drone fleet controller 107.

The drone fleet 146 may comprise one or more drones providing a number of specialized functionalities required to execute the mission; for example, where the mission comprises scanning water pipes for leaks, at least one drone comprising the drone fleet 146 may comprise an infrared camera for detecting leaks, and at least one drone comprising the drone fleet 146 may be equipped with a narrow-angle visual camera for taking high-resolution imagery of any leaks detected by the drones equipped with infrared cameras. In embodiments, the drone fleet 146 may comprise one or more relay drones equipped with long-range and short-range communications devices, which may communicate with the drone fleet controller 107 using the long-range communications devices and may relay communications between drones comprising the drone fleet 146 using the short-range communications devices. All drones comprising drone fleet 146 may be equipped with at least short-range communications devices to receive mission instructions from drone fleet controller 107 and to relay data back to drone fleet controller 107, either directly or through some number or combination of intermediate drones such as relay drones, ground stations, or other devices.

The rescue drones may be any drones that are assigned a rescue mission; a rescue mission may be a class of mission separate from the sub-missions comprising the mission. In embodiments, the rescue drones may additionally comprise a class of drones equipped with the ability to attach to and carry one or more of the other drones, for example using a magnetic clamp, a mechanical claw or hook, a sling, and/or any other means of attachment. The rescue mission may comprise staying close to other drones to increase the statistical probability that a given rescue drone will be close to any malfunctioning drone once a malfunction is detected and decrease the time it takes for the rescue drone to respond. The rescue mission may include moving to a malfunctioning drone, attaching to it, and navigating the malfunctioning drone to a safe landing location. A drone may be pre-assigning a rescue mission upon or prior to commencement of the mission or may be dynamically assigned a rescue mission during the course of the mission, for example in response to detecting a malfunction. A rescue mission may replace or complement a sub-mission. For example, in embodiments, the rescue drones may not participate directly in achieving the mission objectives but may merely be instructed to keep close with other drones and stand by to rescue malfunctioning drones as necessary. In an exemplary embodiment, the rescue drones may be equipped with physical attachment mechanisms to provide physical attachment functionality, but may be equipped with additional specialized functionalities related to performance of the mission, and may participate in executing the mission until such time as they are instructed to perform a rescue of another drone by drone fleet controller 107.

In embodiments, the drone fleet 146 may comprise multiple rescue drones; in some embodiments, for example where rescue drones are equipped to perform physical attachment to a malfunctioning drone, the rescue drones may be equipped with enough lifting capacity to carry any of the other non-rescue drones, or may be equipped with enough lifting capacity to carry any other drones including other rescue drones. In embodiments, the drone fleet 146 may comprise multiple rescue drones equipped with physical attachment mechanisms and possessing differing amounts of lifting capacity, such that any rescue drone so equipped can carry at least one other drone of the drone fleet 146, and at least one or at least two of the physical-attachment-capable rescue drones can carry any other drone comprising the drone fleet 146. In embodiments, drones equipped with physical attachment functionalities may be pre-assigned and/or permanently dedicated to the rescue mission, while other drones capable of virtual attachment may be dynamically assigned the rescue mission when needed. A malfunctioning rescue drone may be re-classified as a malfunctioning drone and may no longer be considered a rescue drone nor operated to perform the rescue mission.

According to the present embodiment, the drone fleet controller 107 may be a program capable of controlling the drone fleet 146 by issuing commands comprising the mission instructions to the drones comprising the drone fleet 146 in real time or near real time over the WAN 102. The drone fleet controller 107 may be capable of receiving telemetry from the drones comprising the drone fleet 146 in real time or near real time over the WAN 102. The drone fleet controller 107 may be responsible for the end-to-end execution of the entire mission of the drone fleet 146, the coordination between the drones themselves, updating the status of sub-missions associated with each drone (failed, stopped, completed etc.) in real-time, maintaining the status of the mission accordingly based on the status of the sub-missions, and tracking and maintaining the safety of each and every drone member in the fleet. The drone fleet controller 107 may be equipped and configured to receive acknowledgments from every drone in the drone fleet 146 regarding the drone's mission status and update the status of the mission accordingly. For example, when a drone reports to the drone fleet controller 107 that its sub-mission has been completed, the drone fleet controller 107 may decide whether to transmit an instruction to the drone to "go home" to a safety landing point and land, transmit an instruction to continue to execute another sub-mission that is required, or transmit an instruction to hover in the air until the mission is completed and then return to the safety landing point together with all other drones of drone fleet 146. In embodiments of the invention, drone fleet controller 107 may interoperate with and/or comprise drone rescue program 108. In embodiments of the invention, the drone fleet controller 107 may be stored and/or run within or by any number or combination of devices including computer 101, end user device 103, remote server 104, private cloud 106, and/or public cloud 105, peripheral device set 114, and server 112 and/or on any other device connected to WAN 102, including processing devices comprising drone fleet 146. Furthermore, drone fleet controller 107 may be distributed in its operation over any number or combination of the aforementioned devices.

According to the present embodiment, the drone rescue program 108 may be a program enabled to, among other things, identify a malfunction in a drone operating as part of a drone fleet, tow the malfunctioning drone to a safe landing location using a rescue drone, and reconfigure drone fleet mission instructions to exclude the rescue drone and the malfunctioning drone. The drone rescue program 108 may, when executed, cause the computing environment 100 to carry out a drone rescue process 200. The drone rescue process 200 may be explained in further detail below with respect to FIG. 2. In embodiments of the invention, the drone rescue program 108 may be stored and/or run within or by any number or combination of devices including computer 101, end user device 103, remote server 104, private cloud 106, and/or public cloud 105, peripheral device set 114, and server 112 and/or on any other device connected to WAN 102, including processing devices comprising drone fleet 146. Furthermore, drone rescue program 108 may be distributed in its operation over any number or combination of the aforementioned devices. In embodiments of the invention, drone rescue program 108 may be a component, subroutine, functionality, et cetera of drone fleet controller 107, and/or may otherwise interoperate with and/or be in communication with drone fleet controller 107. In embodiments of the invention, drone rescue program 108 may be a standalone program or service independent of drone fleet controller 107.

Figure 2:
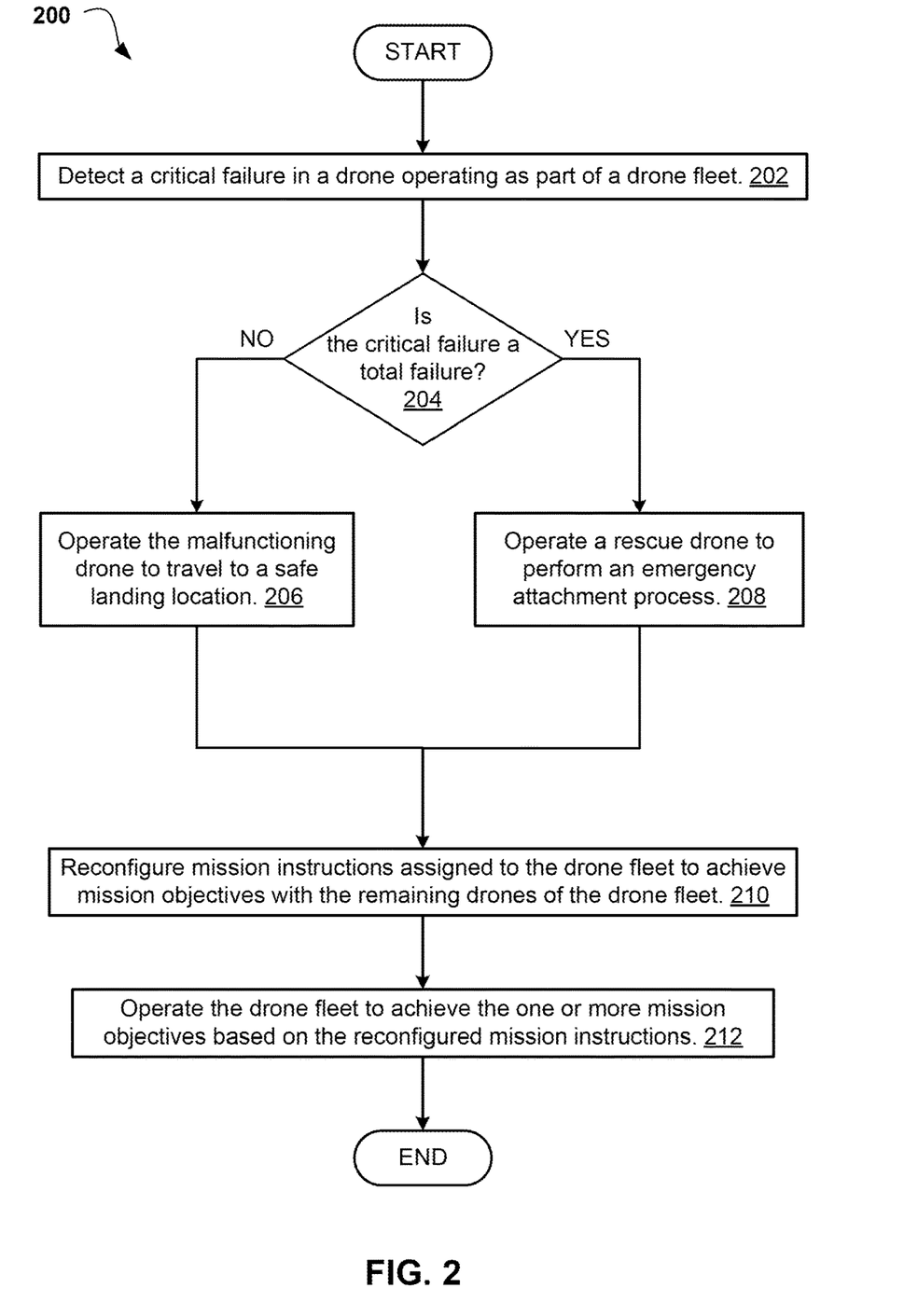
FIG. 2 depicts an operational flowchart illustrating a drone rescue process according to at least one embodiment.

Referring now to FIG. 2, an operational flowchart illustrating a drone rescue process 200 is depicted according to at least one embodiment. At 202, the drone rescue program 108 may detect a critical failure in a drone operating as part of a drone fleet. Here, when one of the drones of the drone fleet 146 experiences a malfunction, the malfunctioning drone may transmit a message to drone rescue program 108 reporting the malfunction. The drones comprising the drone fleet 146 may be equipped with a self-diagnostic system that may be capable of identifying errors in the hardware or software components comprising the drone, such as the drone's sensors. Upon identifying any such hardware or software error, the drone may transmit the error information to the drone rescue program 108. In embodiments of the invention, the drone rescue program 108 may identify a drone as malfunctioning if the drone fails to respond to or acknowledge one or more messages or commands from drone rescue program 108 or fails to report position and/or sensor data within a threshold period of time; if positional data received from the drone does not match an expected position of the drone, for example where the drone has deviated from its instructed course beyond a minimum acceptable deviation threshold; and/or where drone rescue program 108 identifies damage or anomalous behavior in a drone within sensor data from one or more other drones in drone fleet 146. The drone rescue program 108 may use machine vision and image processing techniques to identify damage visible on a drone using external sensor data, such as camera or sonar data from other drones of drone fleet 146 or external IoT sensors such as security cameras external to the drone fleet 146. The drone rescue program 108 may identify anomalous behavior such as one or more rotors of a drone not spinning or spinning at a reduced speed, instability in flight, erratic motions, changes in altitude such as gradual or rapid descent, et cetera by identifying a drone in sensor data from drone fleet 146 or external IoT sensors and comparing its position and movement in the sensor data against the position and movement of the sensor providing the sensor data, and the navigation data issued to the drone.

The drone rescue program 108 may analyze sensor data and/or received error messages and determine if a drone is experiencing a critical failure. The drone rescue program 108 may analyze the error messages and sensor data to identify what components of the drone were affected, the severity of the failure, and how such a failure could affect the performance of the drone. A critical failure or critical malfunction may be a software and/or hardware failure affecting the drone such that the drone has lost the ability to carry out the sub-mission or rescue mission to which it was assigned. For example, if a drone is assigned to a sub-mission requiring specialized hardware, such as an IR scanner for analyzing leaks, and the drone rescue program 108 determines that the IR scanner on the drone is not functional or exhibits performance degraded below a threshold acceptable value, then the drone rescue program 108 may identify the drone as experiencing a critical failure. Likewise, if the drone loses the ability to receive or transmit commands, execute its assigned flight path, or collect sensor data required for the mission and/or for basic flight, the drone rescue program 108 may consider the drone to be experiencing a critical malfunction. If the drone is exhibiting a malfunction but drone rescue program 108 has not identified the malfunction as critical, the drone rescue program 108 may monitor the drone using sensor data, may pre-position a rescue drone close to the malfunctioning drone, and/or may alert one or more human users, but may otherwise allow the drone to continue executing its sub-mission.

At 204, the drone rescue program 108 may determine whether the critical failure is a total failure. A total failure may be a critical failure that affects a drone's ability to fly unaided. The drone rescue program 108 may be pre-provided with a list of criteria applying to one or more drones regarding the components and performance thresholds required for flight and navigation, such that if any of those required components malfunction, and/or if performance of one or more of those components falls below an associated performance threshold, the drone will no longer be able to remain airborne and/or move and operate independently. The drone rescue program 108 may alternatively or additionally observe a loss of control or altitude in a drone and infer a total failure to enable quick reaction and rescue of the drone. A total failure may comprise a flight failure, which may be a total loss of ability to remain airborne potentially resulting in a crash, such as power loss, damaged engines or rotors, and/or partial damage to a drone's flight characteristics such that its flight becomes erratic, unstable, uncontrollable, and/or likely to cause collision; flight failures may require rescue through physical attachment, using a mechanism to physically hold and restrain the malfunctioning drone and prevent the malfunctioning drone from crashing. A total failure may comprise a navigation failure, which may be a loss of ability to navigate and operate independently, including a loss of lidar, sonar, imaging sensors, or other sensors that provide data necessary for accurate aerial navigation, or a loss of ability to send, receive or process data from the drone rescue program 108; in the event of a navigation failure, the malfunctioning drone may be rescued through either physical attachment or virtual attachment. The drone rescue program 108 may identify a drone as experiencing a total failure if one or more flight-critical or navigation-critical hardware or software components are offline or are experiencing performance degraded below a minimum flight performance threshold; if the drone fails to respond to messages or instructions within a threshold amount of time, if the drone's flight is observed in sensor data to deviate from its plotted course beyond a second, greater threshold, et cetera. According to at least one implementation, if the drone rescue program 108 determines that the critical failure is not a total failure (step 204, "NO" branch), the drone rescue program 108 may continue to step 206 to operate the malfunctioning drone to travel to a safe landing location. If the drone rescue program 108 determines that the critical failure is a total failure (step 204, "YES" branch), the drone rescue program 108 may continue to step 208 to operate a rescue drone to navigate the malfunctioning drone to a safe landing location.

At 206, the drone rescue program 108 may operate the malfunctioning drone to travel to a safe landing location. Here, if the drone is experiencing a critical malfunction but not a total malfunction, the drone rescue program 108 may transmit instructions to the malfunctioning drone to travel to a safe landing location, land, and power off. The safe landing location may be pre-provided to drone rescue program 108 and may comprise a flat surface of a size large enough to accommodate the drone. In embodiments, multiple safe landing locations may be pre-provided, and may be of different sizes; drone rescue program 108 may select the safe landing location that is closest to the malfunctioning drone at the time that the critical malfunction is identified, and which is large enough to accommodate the malfunctioning drone.

In embodiments, rather than directing the malfunctioning drone to land, the drone rescue program 108 may determine whether the malfunctioning drone is capable of carrying out a different sub-mission or rescue mission than the one to which it was originally assigned and which it is no longer capable of carrying out, and may assign the malfunctioning drone to another sub-mission that it is capable of carrying out. For example, where a drone fleet 146 is tasked with the mission of visually inspecting a pipeline and checking for leaks using an infrared camera, and an infrared-camera-equipped drone experiences a malfunction in its infrared camera, the malfunctioning drone may no longer be capable of executing its leak identification mission. However, the malfunctioning drone may still be equipped with a visual spectrum camera and may therefore be capable of providing a visual inspection of the pipeline. In such a scenario, the drone rescue program 108 may identify that the malfunctioning hardware is only needed for one sub-mission type and all necessary hardware and functionality to execute the visual inspection sub-mission is present, and may therefore re-assign the infrared camera drone to perform a visual inspection sub-mission and provide visual data on a sub-region of the pipeline.

At 208, the drone rescue program 108 may operate a rescue drone to perform an emergency attachment process. The emergency attachment process may comprise selecting a rescue drone and navigating the selected rescue drone to the location of the malfunctioning drone; upon entering a threshold proximity of the malfunctioning drone, the rescue drone may physically or virtually attach to the malfunctioning drone, and may safely tow both drones to a safe landing point by using data from the rescue drone's sensors to inform navigation of both drones. The emergency attachment process may be discussed below in greater detail with respect to FIG. 3.

At 210, the drone rescue program 108 may reconfigure mission instructions assigned to the drone fleet to achieve mission objectives with the remaining drones of the drone fleet. Here, the drone rescue program 108 may update the list of available drones and functionalities comprising drone fleet 146 to subtract the malfunctioning drone, any rescue drones that may be tasked with rescuing the malfunctioning drone, and any specialized functionalities provided by the malfunctioning drone and the rescue drones. The drone rescue program 108 may then assess the mission objectives to determine whether the mission can still be completed with the remaining drones and functionalities. If no mission objectives can be completed, the drone rescue program 108 may abort the mission and command the drone fleet 146 to return to a pre-determined home location. If some or all mission objectives can be completed with the remaining drones and functionalities, the drone rescue program 108 may modify the sub-missions assigned to each remaining drone, or assign new sub-missions to each remaining drone, such that the sub-missions collectively divide all remaining tasks necessary to the completion of some or all mission objectives among the remaining drones. For example, where the mission comprises surveying a field, and a survey drone assigned the sub-mission of surveying a portion of the field experiences a total failure, the drone rescue program 108 may modify the sub-missions of the remaining drones to expand the sub-regions of the field that each drone was tasked with surveying, such that the flight pattern of each remaining drone is extended slightly to cover a portion of the region that the malfunctioning drone was originally tasked with surveying. In embodiments, the drone rescue program 108 may anticipate the return of any rescue drones tasked with assisting a malfunctioning drone based on the distance of the safe landing zone from the drone fleet 146, and may reconfigure the mission instructions on the assumption that the drones and functionality represented by the rescue drones will be returned to the pool of resources available to the drone fleet 146 and will be once more available to perform sub-missions. In embodiments, rescue missions may likewise be re-allocated to, for example, ensure that a minimum number or coverage of rescue drones is maintained, and/or rescue drones may be re-assigned from a rescue mission to a sub-mission to ensure that enough drones are performing sub-missions to accomplish the mission.

At 212, the drone rescue program 108 may operate the drone fleet to achieve the one or more mission objectives based on the reconfigured mission instructions. Here, the drone rescue program 108 may transmit the reconfigured mission objectives and/or sub-missions to the remaining drones of the drone fleet 146 and may further transmit any navigation data, flight data, location data, instructions, et cetera necessary to achieving such sub-missions to the individual drones. For example, the drone rescue program 108 may connect with the onboard operating system of the drone using an application programming interface, through which drone rescue program 108 may instruct the drone to survey a structure as its assigned sub-mission, and may operate the drone to execute that sub-mission by transmitting commands to move to a series of waypoints, face a certain direction, engage a surveying device, move vertically and horizontally while keeping the surveying device fixed directly ahead to survey a defined sub-region of the structure, and then transmitting instructions to return back to a pre-determined home location via a series of waypoints, at an instructed speed, bearing, and altitude. The drone rescue program 108 may continually modify the navigation data of the drones to dynamically account for wind, pressure, turbulence, and the movement and rotor wash of other drones of the drone fleet 146.

Figure 3:
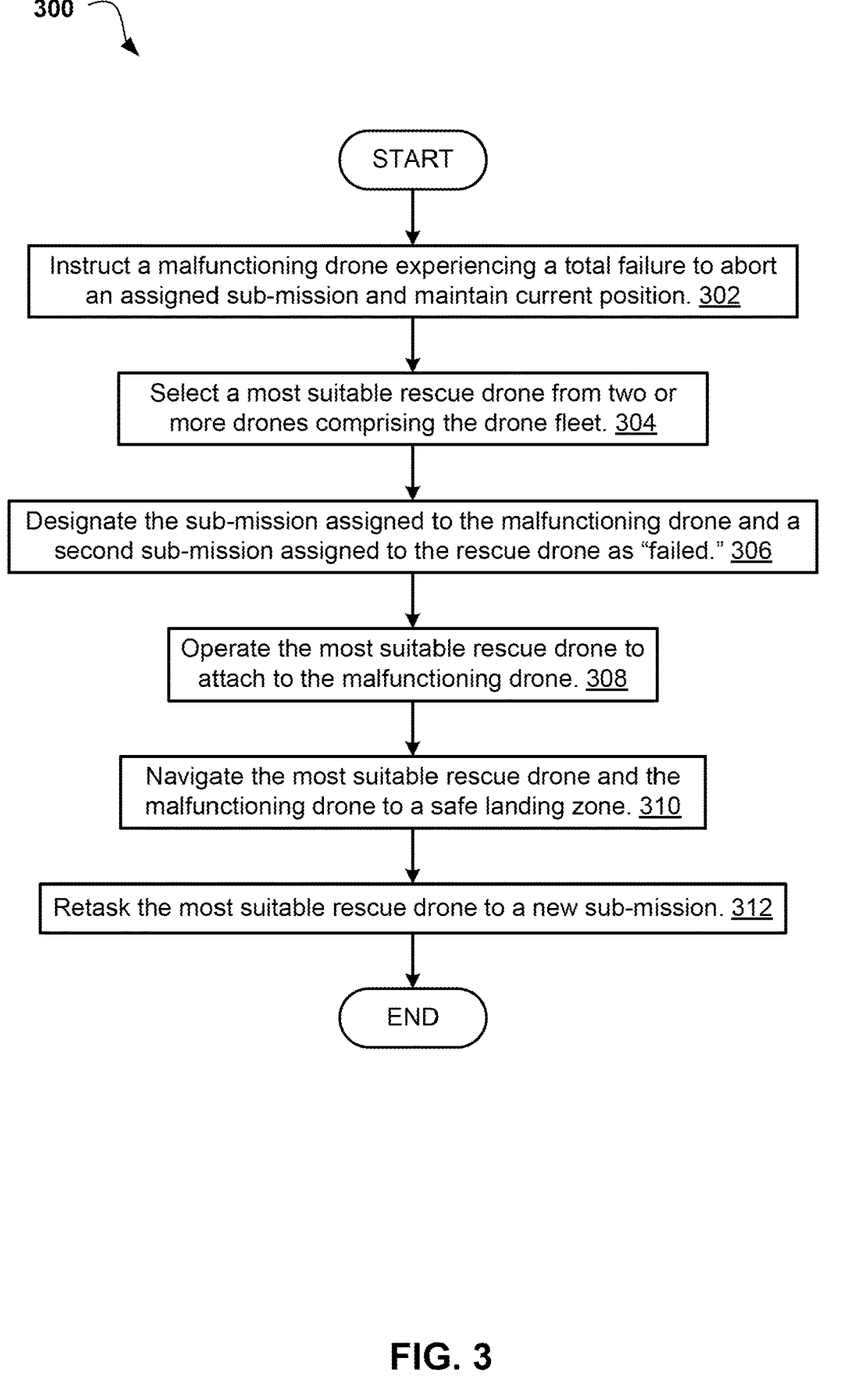
FIG. 3 depicts an operational flowchart illustrating an emergency attachment process of a drone rescue process according to at least one embodiment.

Referring now to FIG. 3, an operational flowchart illustrating an emergency attachment process 300 of a drone rescue process 200 is depicted according to at least one embodiment. At 302, the drone rescue program 108 may instruct a malfunctioning drone experiencing a critical malfunction to abort an assigned sub-mission and maintain current position. The drone rescue program 108 may transmit a command to the malfunctioning drone to stop moving, stabilize itself, and maintain position. The drone rescue program 108 may operate the drone to correct for the effects of the malfunction to the extent possible in order to buy time for a rescue drone to arrive. For example, if the drone is losing power and altitude, the drone rescue program 108 may operate the drone to boost engine power as much as possible to slow the descent.

At 304, the drone rescue program 108 may select a most suitable rescue drone from two or more rescue drones comprising the drone fleet. In embodiments where there are more than one drone comprising drone fleet 146 that may be capable of performing a rescue mission, the drone rescue program 108 must select a drone that is most suitable for rescuing the malfunctioning drone from among multiple potential rescue drones. In embodiments, the drone rescue program 108 may determine whether a detected total failure is a navigation failure or a flight failure; the drone rescue program 108 may identify a drone as experiencing a navigation failure if one or more navigation-critical hardware or software components are offline or are experiencing performance degraded below a minimum flight performance threshold, if the drone's horizontal flight is observed in sensor data to deviate from its plotted course by an amount exceeding both a minimum acceptable deviation threshold and a second deviation threshold which is greater than the minimum acceptable deviation threshold, if the drone fails to respond to messages or instructions within a threshold amount of time, et cetera. The drone rescue program 108 may identify a drone as experiencing a flight failure if one or more flight-critical hardware or software components are offline or are experiencing performance degraded below a minimum flight performance threshold; if the drone's vertical flight is observed in sensor data to deviate downwards from its plotted course, et cetera. If the drone rescue program 108 identifies both a flight failure and a navigation failure, drone rescue program 108 may classify the malfunctioning drone as suffering a flight failure. If the malfunctioning drone is suffering a flight failure, the drone rescue program 108 may select the most suitable rescue drone from among one or more drones equipped to perform a physical attachment to the malfunctioning drone. If the malfunctioning drone is suffering a navigation failure, the drone rescue program 108 may select the most suitable drone from among all drones capable of performing a virtual attachment, which may be any drone in the drone fleet 146 including drones capable of performing a physical attachment.

In embodiments, the most suitable rescue drone may be the drone that is closest to the malfunctioning drone, whichever drone can reach the malfunctioning drone the quickest, and/or whichever drone is equipped to rescue the malfunctioning drone. In embodiments, for example where the malfunctioning drone is experiencing a navigation failure, a drone may be equipped to rescue the malfunctioning drone if it possesses the fuel or power, sensor, flight and communications functionality to reach the malfunctioning drone and navigate it to the safe landing area. In embodiments, for example where the malfunctioning drone is experiencing a flight failure, a drone may be equipped to rescue the malfunctioning drone if it possess a lifting capacity sufficient to lift the malfunctioning drone, an attachment mechanism that is of the correct size, strength and shape to engage with and securely hold the malfunctioning drone, sufficient remaining power or fuel to transport the malfunctioning drone from its current location to the safe landing location factoring in the increased power consumption of towing another drone, a sufficient top speed to intercept the malfunctioning drone, et cetera. Multiple criteria may be taken into account when selecting the most suitable rescue drone; for example, the most suitable rescue drone may be the closest drone equipped to rescue the malfunctioning drone. The drone rescue program 108 may consult a database of technical specifications associated with the rescue drones in determining, for example, speed, attachment mechanism, and lifting/payload capacity. In embodiments, the drone rescue program 108 may score one or more drones and/or rescue drones based on their proximity to the malfunctioning drone, speed, lifting capacity, and attachment compatibility, and choose the highest scoring drone. In some embodiments, multiple drones may be selected to jointly attach to and tow a malfunctioning drone suffering a flight failure, so long as their combined lifting capacity is sufficient to lift the malfunctioning drone. In such embodiments, the rescue drones with the highest scores may be selected.

At 306, the drone rescue program 108 may designate the sub-mission assigned to the malfunctioning drone and a second sub-mission assigned to the rescue drone as "failed." In embodiments, the drone rescue program 108 may track progress of sub-missions through designations such as "in progress," "not started," "unassigned," "completed," et cetera, which may be regularly updated to reflect the current status of the sub-missions. As the malfunctioning drone must necessarily abandon its sub-mission, and is unlikely to return to it, the drone rescue program 108 may update the sub-mission of the malfunctioning drone as "failed," and may reassign the sub mission to another drone. In embodiments where the rescue drone performs or was previously performing a sub-mission and is not devoted full-time to a rescue mission, the drone rescue program 108 may likewise designate the sub-mission of the rescue drone as "failed." In embodiments, for example where the safe landing location is near and the rescue drone has sufficient power to return and resume performing a sub-mission, the drone rescue program 108 may designate the status of the rescue drone as "delayed" or "suspended," to reflect the temporary absence of the rescue drone, or may mark the sub-mission as "failed" and re-assign it to the next available drone, which may include the rescue drone.

At 308, the drone rescue program 108 may operate the most suitable rescue drone to physically or virtually attach to the malfunctioning drone. Here, the drone rescue program 108 may operate the most suitable rescue drone to leave its station or sub-mission and move to the location of the malfunctioning drone. The most suitable rescue drone may then attach to the malfunctioning drone. In embodiments, for example where the malfunctioning drone is experiencing a flight failure, the most suitable rescue drone may physically attach using its attachment mechanism. The attachment mechanism may be any mechanism designed to mechanically connect the rescue drone with the malfunctioning drone, such that the rescue drone can carry the malfunctioning drone if necessary. The attachment mechanism may be a hook, clamp, claw, magnet, and/or any other device capable of mechanically or electromagnetically forming a secure connection with the malfunctioning drone which may be lowered from the rescue drone via a flexible line such as a string or wire, or through an extendable and/or manipulable mechanical arm. In some embodiments, the attachment mechanism may comprise a tray or landing platform on the dorsal surface of the rescue drone sufficient to catch a malfunctioning drone descending from above. In some embodiments, for example where the malfunctioning drone has entirely lost power, attaching to the malfunctioning drone may necessarily be accomplished by intercepting the falling malfunctioning drone and connecting to it in mid-fall.

In embodiments, for example where the malfunctioning drone is experiencing a navigation failure, the drone rescue program 108 may operate the most suitable rescue drone to virtually attach to the malfunctioning drone by leaving its station or sub-mission and moving to close physical proximity of the malfunctioning drone, such that the sensor data gathered by the most suitable rescue drone, such as camera, sonar, and/or GPS location data, may be used to navigate the malfunctioning drone; once in close physical proximity to the malfunctioning drone, the drone rescue program 108 may issue navigation commands to the malfunctioning drone using sensor data from the rescue drone, allowing the drone rescue program 108 to navigate the malfunctioning drone to a safe landing location. The drone rescue program 108 may maintain the virtual attachment, which may include maintaining the proximity of the rescue drone to the malfunctioning drone, until the malfunctioning drone has landed at the safe landing location.

At 310, the drone rescue program 108 may navigate the most suitable rescue drone and the malfunctioning drone to a safe landing zone. Once the rescue drone is securely attached, the drone rescue program 108 may operate the two drones to navigate them to the secure landing location. The drone rescue program 108 may operate the rescue drone by consolidating all instructions to be sent to the malfunctioning drone and the rescue drone, as if the pair were a single drone. In other words, the drone rescue program 108 may send identical instructions to the two drones. In this way, drone rescue program 108 may operate the two drones in concert, such that the malfunctioning drone may assist the rescue drone in flight to the extent that the malfunctioning drone is still able. The drone rescue program 108 may navigate the most suitable rescue drone to the safe landing zone, lower the attached malfunctioning drone onto the surface of the safe landing zone, and disengage the attachment mechanism to sever the mechanical link between the rescue drone and the malfunctioning drone. At this point, the drone rescue program 108 may cease sending instructions to the malfunctioning drone and cease the consolidation whereby the rescue drone and malfunctioning drone were treated as a single entity for receiving instructions. The drone rescue program 108 may instruct the malfunctioning drone to power down and may alert a human user to the location and/or the successful rescue of the malfunctioning drone.

At 312, the drone rescue program 108 may retask the most suitable rescue drone to a new sub-mission. Once the malfunctioning drone has been escorted to the safe landing location and the rescue drone has disengaged the attachment mechanism, the rescue drone may become available for re-tasking. The drone rescue program 108 may accordingly assign a new sub-mission to the suitable rescue drone by selecting a sub-mission of the plurality of sub-missions comprising the mission which has not yet been started, has not yet been completed, and/or is not currently assigned to another drone. The drone rescue program 108 may select a sub-mission based on the ability of the rescue drone to carry out the sub-mission, the distance of the sub-mission from the safe landing location, the rescue drone's remaining power or fuel reserves, et cetera. In embodiments, for example where rescue drones are not assigned sub-missions but are instead devoted full time to the task of rescuing, the rescue drone may be assigned to a new rescue mission, such as keeping physically proximate to other drones and maintaining availability for any rescue that may become necessary.

Figure 4:
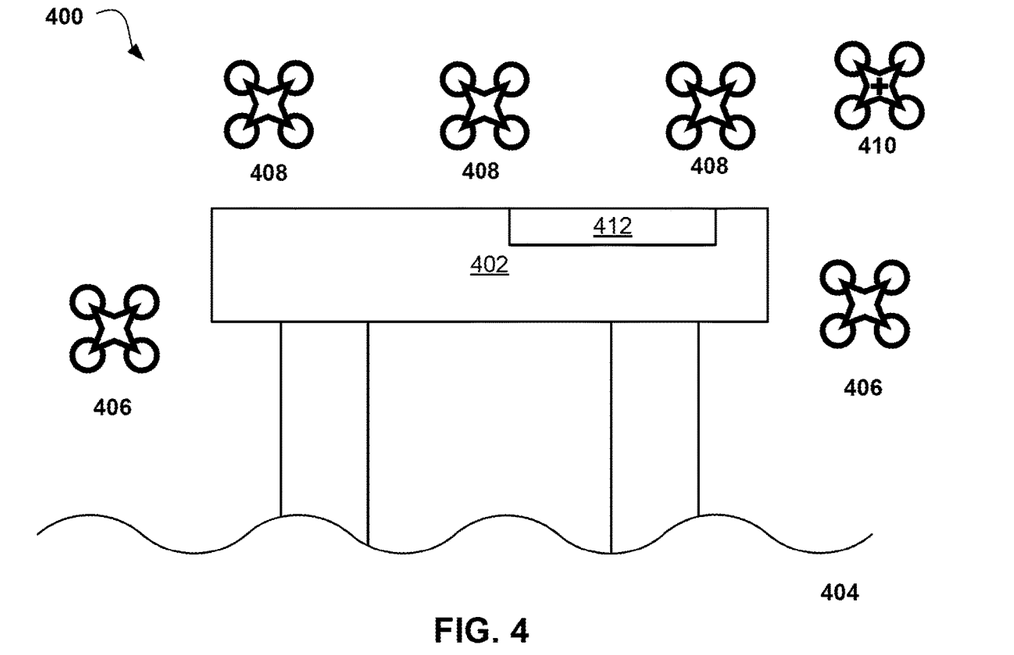
FIG. 4 depicts a diagram illustrating an exemplary use case of an implementation of drone rescue process according to at least one embodiment.

Referring now to FIG. 4, a diagram illustrating an exemplary use case 400 of an implementation of drone rescue process 200 is depicted according to at least one embodiment. Here, a drone fleet 146 is assigned to perform a structural inspection of bridge 402 which crosses river 404. Drone fleet 146 comprises a number of drones 406 tasked with the mission objective of performing structural inspections of the bridge supports using specialized infrared cameras, and drones 408 which are tasked with performing structural inspections of the road surface of the bridge using non-specialized visual cameras, as well as a rescue drone 410, which is equipped with a retractable clamp suitable for physically attaching to another drone, and tasked with a rescue mission comprising flying close with other drones and being available to perform a rescue if necessary. The drone rescue program 108 may operate rescue drone 410 to be as close to as many drones as possible, so as to minimize response time should a rescue be required. A section of bridge 402 has been cordoned off from traffic for construction purposes and makes for a convenient safe landing location 412.

Figure 5:
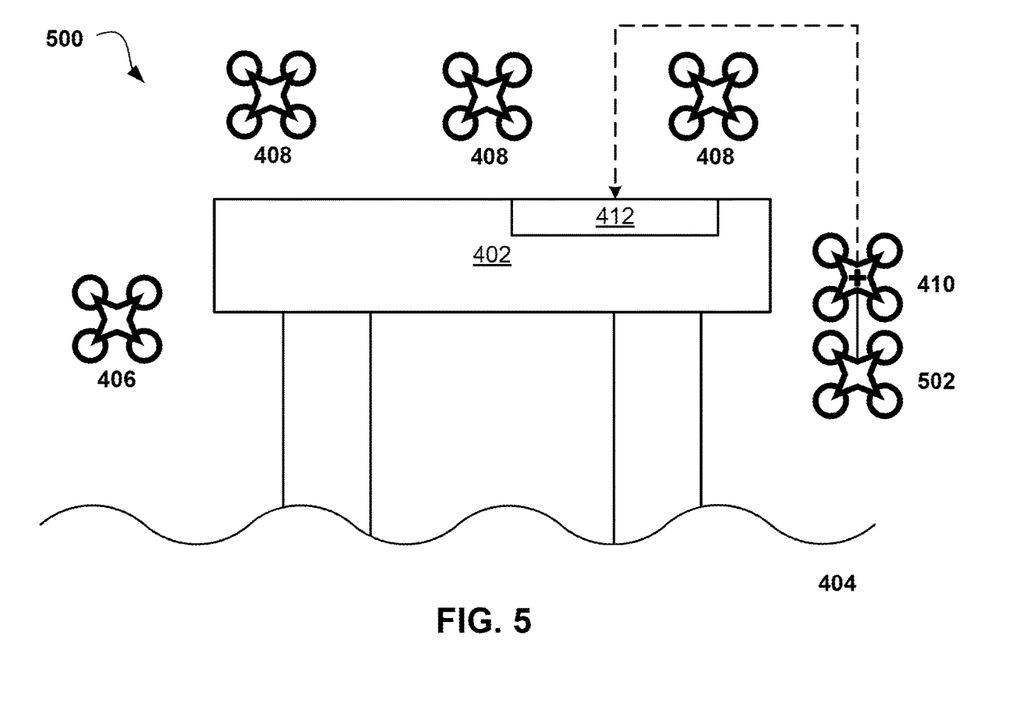
FIG. 5 depicts a diagram illustrating an exemplary use case of an implementation of drone rescue process according to at least one embodiment.

Referring now to FIG. 5, a diagram illustrating an exemplary use case 500 of an implementation of drone rescue process 200 is depicted according to at least one embodiment. Here, one of the drones 406 performing structural inspections of the supports of bridge 402 has suffered a total malfunction and has lost altitude, and drone rescue program 108 has identified it as a malfunctioning drone 502, specifically a malfunctioning drone experiencing a total failure. The drone rescue program 108 detects the malfunction and determines its nature as a flight failure, and selects rescue drone 410 as the most suitable rescue drone due to its staging location close to other drones, its physical attachment capability, the fact that rescue drone 410 possesses adequate power reserves to reach malfunctioning drone 502 and tow it to safe landing location 412, and the fact that rescue drone 410 is speedy enough to reach and intercept the malfunctioning drone 502 before it impacts the river 404. Accordingly, rescue drone 410 is able to quickly move to location of the malfunctioning drone 502 and connect to it with the retractable clamp before it falls into the river 404. The drone rescue program 108 operates the rescue drone 410 and malfunctioning drone 502 in concert to navigate to safe landing location 412, where the malfunctioning drone 502 may be safely deposited. The drone rescue program 108 then assigns rescue drone 410 a new rescue mission and divides the infrared surveying sub-mission previously assigned to malfunctioning drone 502 among infrared-camera-equipped drones 406.

It may be appreciated that FIGS. 2-5 provide only illustrations of individual implementations and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for rescuing a malfunctioning drone comprising a drone fleet, the method comprising:

responsive to detecting a total failure comprising a navigation failure in the malfunctioning drone, operating one or more rescue drones of the drone fleet to physically or virtually attach to the malfunctioning drone;

responsive to detecting the total failure comprising a flight failure in the malfunctioning drone, operating the one or more rescue drones to physically attach to the malfunctioning drone; and transporting, by the one or more rescue drones, the malfunctioning drone to a safe landing location.

2. The method of claim 1, wherein the one or more rescue drones are selected from a plurality of drones comprising the drone fleet based on a distance from the malfunctioning drone, whether the malfunctioning drone is suffering one of the flight failure or the navigation failure, a distance from the safe landing location, a speed, a lifting capacity, an attachment mechanism, and/or a power reserve.

3. The method of claim 1, further comprising:
reconfiguring a plurality of sub-missions comprising a mission of the drone fleet to compensate for an absence of the malfunctioning drone and the one or more rescue drones.

4. The method of claim 1, further comprising:
responsive to detecting the total failure in the malfunctioning drone, canceling a sub-mission assigned to the malfunctioning drone.

5. The method of claim 1, further comprising:
responsive to delivering the malfunctioning drone to the safe landing location, assigning a sub-mission to the one or more rescue drones.

6. The method of claim 1, wherein the transporting further comprises:
transmitting a plurality of same instructions to both the one or more rescue drones and the malfunctioning drone, based on sensor data from the one or more rescue drones.

7. The method of claim 1, wherein the detecting is based on identifying anomalous behavior based on sensor data from a plurality of sensors comprising one or more drones comprising the drone fleet.

8. A computer system for rescuing a malfunctioning drone comprising a drone fleet, the computer system comprising:
one or more processors, one or more computer readable memories, one or more computer readable tangible storage medium, and program instructions stored on at least one of the one or more tangible storage medium for execution by at least one of the one or more processors via at least one of the one or more memories, wherein the computer system is capable of performing a method comprising:
responsive to detecting a total failure comprising a navigation failure in the malfunctioning drone, operating one or more rescue drones of the drone fleet to physically or virtually attach to the malfunctioning drone;
responsive to detecting the total failure comprising a flight failure in the malfunctioning drone, operating the one or more rescue drones to physically attach to the malfunctioning drone; and
transporting, by the one or more rescue drones, the malfunctioning drone to a safe landing location.

9. The computer system of claim 8, wherein the one or more rescue drones are selected from a plurality of drones comprising the drone fleet based on a distance from the malfunctioning drone, whether the malfunctioning drone is suffering one of the flight failure or the navigation failure, a distance from the safe landing location, a speed, a lifting capacity, an attachment mechanism, and/or a power reserve.

10. The computer system of claim 8, further comprising:
reconfiguring a plurality of sub-missions comprising a mission of the drone fleet to compensate for an absence of the malfunctioning drone and the one or more rescue drones.

11. The computer system of claim 8, further comprising:
responsive to detecting the total failure in the malfunctioning drone, canceling a sub-mission assigned to the malfunctioning drone.

12. The computer system of claim 8, further comprising:
responsive to delivering the malfunctioning drone to the safe landing location, assigning a sub-mission to the one or more rescue drones.

13. The computer system of claim 8, wherein the transporting further comprises:
transmitting a plurality of same instructions to both the one or more rescue drones and the malfunctioning drone, based on sensor data from the one or more rescue drones.

14. The computer system of claim 8, wherein the detecting is based on identifying anomalous behavior based on sensor data from a plurality of sensors comprising one or more drones comprising the drone fleet.

15. A computer program product for rescuing a malfunctioning drone comprising a drone fleet, the computer program product comprising:
one or more computer readable tangible storage medium and program instructions stored on at least one of the one or more tangible storage medium, the program instructions executable by a processor to cause the processor to perform a method comprising:
responsive to detecting a total failure comprising a navigation failure in the malfunctioning drone, operating one or more rescue drones of the drone fleet to physically or virtually attach to the malfunctioning drone;
responsive to detecting the total failure comprising a flight failure in the malfunctioning drone, operating the one or more rescue drones to physically attach to the malfunctioning drone; and
transporting, by the one or more rescue drones, the malfunctioning drone to a safe landing location.

16. The computer program product of claim 15, wherein the one or more rescue drones are selected from a plurality of drones comprising the drone fleet based on a distance from the malfunctioning drone, whether the malfunctioning drone is suffering one of the flight failure or the navigation failure, a distance from the safe landing location, a speed, a lifting capacity, an attachment mechanism, and/or a power reserve.

17. The computer program product of claim 15, further comprising:
reconfiguring a plurality of sub-missions comprising a mission of the drone fleet to compensate for an absence of the malfunctioning drone and the one or more rescue drones.

18. The computer program product of claim 15, further comprising:
responsive to detecting the total failure in the malfunctioning drone, canceling a sub-mission assigned to the malfunctioning drone.

19. The computer program product of claim 15, further comprising:

responsive to delivering the malfunctioning drone to the safe landing location, assigning a sub-mission to the one or more rescue drones.

20. The computer program product of claim 15, wherein the transporting further comprises:

transmitting a plurality of same instructions to both the one or more rescue drones and the malfunctioning drone, based on sensor data from the one or more rescue drones.

* * * * *